United States Patent
Uchiyama

(10) Patent No.: US 11,314,191 B2
(45) Date of Patent: Apr. 26, 2022

(54) POWER SUPPLY APPARATUS AND IMAGE FORMING APPARATUS

(71) Applicant: CANON KABUSHIKI KAISHA, Tokyo (JP)

(72) Inventor: Nobuyuki Uchiyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 17/079,788

(22) Filed: Oct. 26, 2020

(65) Prior Publication Data
US 2021/0124300 A1   Apr. 29, 2021

(30) Foreign Application Priority Data

Oct. 28, 2019 (JP) .............................. JP2019-195264
Oct. 8, 2020 (JP) .............................. JP2020-170747

(51) Int. Cl.
*G03G 15/00* (2006.01)
*H02M 5/12* (2006.01)
*H02M 1/42* (2007.01)

(52) U.S. Cl.
CPC .............. *G03G 15/80* (2013.01); *H02M 5/12* (2013.01); *H02M 1/4258* (2013.01)

(58) Field of Classification Search
CPC ........... G03G 5/10; G03G 15/80; H02M 1/08; H02M 3/33507; H02M 3/33573; H02M 3/3385; H02M 5/12
See application file for complete search history.

(56) References Cited

U.S. PATENT DOCUMENTS

| 7,023,711 | B2 * | 4/2006 | Imamura ............. H02M 1/4258 363/21.18 |
| 8,880,911 | B2 | 11/2014 | Karino et al. ................ 713/300 |
| 9,106,148 | B2 | 8/2015 | Uchiyama ......... H02M 3/33507 |
| 9,304,478 | B2 | 4/2016 | Hayasaki et al. . H02M 3/33569 |
| 9,787,205 | B2 | 10/2017 | Kobayashi et al. ...................... H02M 3/33569 |
| 2005/0117371 | A1 | 6/2005 | Imamura |
| 2013/0236206 | A1 * | 9/2013 | Shoji ................. H02M 3/33523 399/88 |

FOREIGN PATENT DOCUMENTS

JP  3994942 B2  10/2007

* cited by examiner

*Primary Examiner* — Hoang X Ngo
(74) *Attorney, Agent, or Firm* — Venable LLP

(57) ABSTRACT

The power supply apparatus includes a transformer, a switching element, a full-wave rectification circuit, a smoothing circuit having one end connected to a first primary winding of the transformer, and another end connected to a second primary winding of the transformer through the switching element, and a circuit connected to an output end of the full-wave rectification circuit and including an inductor and a rectifying element connected in series with each other, wherein the number of turns of the first primary winding is greater than the number of turns of the second primary winding.

13 Claims, 7 Drawing Sheets

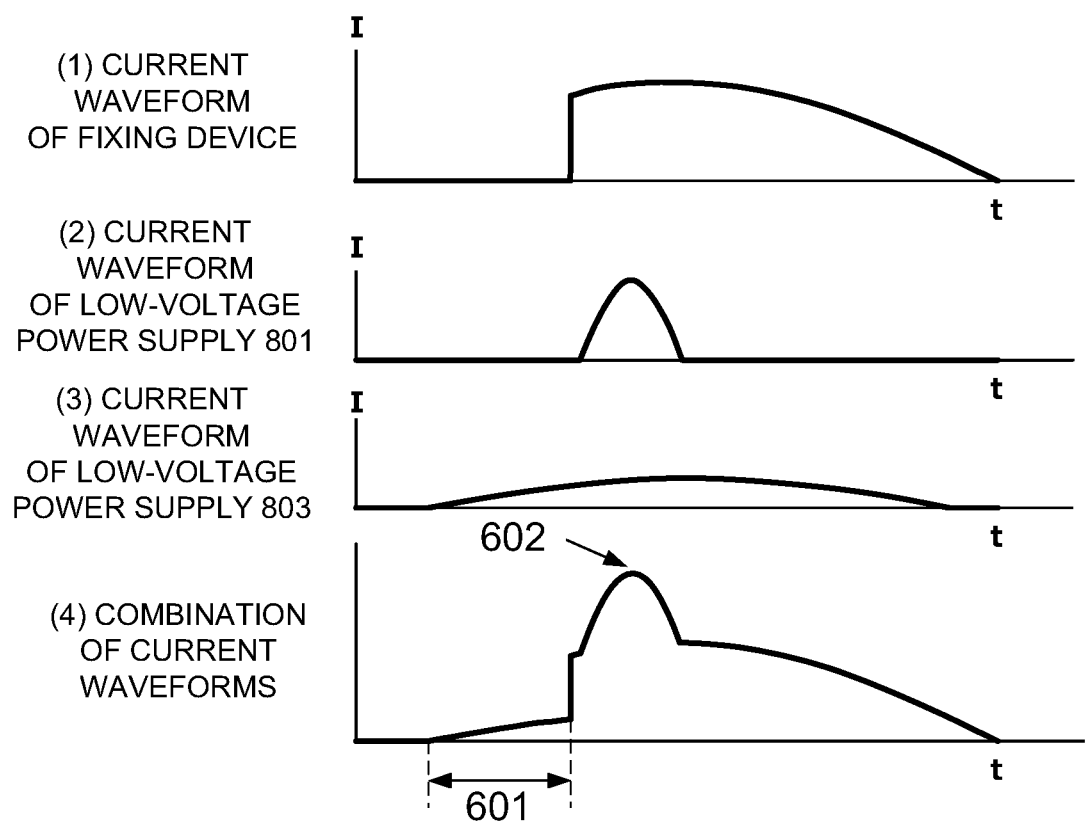

POWER SUPPLY APPARATUS AND IMAGE FORMING APPARATUS

BACKGROUND OF THE INVENTION

Field of the Invention

The present invention relates to a power supply apparatus and an image forming apparatus, and more particularly to a switching power supply and an image forming apparatus that achieve improvement of a power factor.

Description of the Related Art

A general type of a switching power supply includes a smoothing capacitor as the first stage at the input, so that input current starts to flow only when input voltage exceeds charge voltage of the smoothing capacitor. In this configuration, the current flows for a time period shorter than a cycle of the AC voltage of an AC power source, resulting in a tendency toward a low power factor and a large harmonic current. Measures having been taken to solve this problem include providing a coil for power factor improvement in an input filter, or providing, in a stage preceding the switching power supply, a power factor improvement circuit that makes the input current waveform substantially sinusoidal for further improvement in power factor. Of these measures, using the coil in the input filter to improve the power factor increases the power factor to only about 70 to 80%. By contrast, the switching power supply with the power factor improvement circuit can achieve a power factor of almost 100%. Unfortunately, the power factor improvement circuit itself functions as a converter, meaning that the circuit includes two converters, i.e., the power factor improvement circuit and the switching power supply in a subsequent stage. The circuit is therefore inefficient while providing a high power factor, and also tends to involve increases in cost and printed circuit board area. In order to address these inconveniences, switching power supplies have been invented that use a single converter to achieve both a high power factor and a high efficiency. Japanese Patent No. 3994942 discloses a technique for bringing the input current waveform closer to a sinusoidal waveform.

In conventional techniques, a high power factor may not be achieved for certain ratios between a primary winding and an auxiliary winding (turns ratios). The turns ratio between the primary winding and the auxiliary winding has so far not been elucidated. As such, there is a need to clarify the turns ratio between the primary winding and the auxiliary winding to increase the conduction angle of input current.

The present invention has been made under the above circumstances, and an object thereof is to achieve a high power factor characteristic by increasing the time period for which input current flows in the cycle of AC voltage.

SUMMARY OF THE INVENTION

An aspect of the present invention is a power supply apparatus including a transformer having a first primary winding, a second primary winding, and a secondary winding, a switching element connected in series with the first primary winding and the second primary winding, a full-wave rectification circuit configured to full-wave rectify input AC voltage, a smoothing circuit having one end connected to the first primary winding, and another end connected to the second primary winding through the switching element, and a circuit in which an inductor and a rectifying element are connected in series, the circuit connected to an output end of the full-wave rectification circuit, wherein a number of turns of the first primary winding is greater than a number of turns of the second primary winding.

Another aspect of the present invention is an image forming apparatus including an image forming unit configured to form a toner image on a recording material, and a power supply device configured to supply power to the image forming unit, the power supply device including a transformer having a first primary winding, a second primary winding, and a secondary winding, a switching element connected in series with the first primary winding and the second primary winding, a full-wave rectification circuit configured to full-wave rectify input AC voltage, a smoothing circuit having one end connected to the first primary winding, and another end connected to the second primary winding through the switching element, and a circuit in which an inductor and a rectifying element are connected in series, the circuit connected to an output end of the full-wave rectification circuit, wherein a number of turns of the first primary winding is greater than a number of turns of the second primary winding.

A further aspect of the present invention is an image forming apparatus to which an option unit is connected, the option unit configured to process a recording material on which an image is formed, the image forming apparatus including an image forming unit configured to form a toner image on a recording material, a first power supply device configured to supply power to the image forming unit, and a second power supply device configured to supply power to the option unit, the second power supply device including a transformer having a first primary winding, a second primary winding, and a secondary winding, a switching element connected in series with the first primary winding and the second primary winding, a full-wave rectification circuit configured to full-wave rectify input AC voltage, a smoothing circuit having one end connected to the first primary winding, and another end connected to the second primary winding through the switching element; and a circuit in which an inductor and a rectifying element are connected in series, the circuit connected to an output end of the full-wave rectification circuit, wherein a number of turns of the first primary winding is greater than a number of turns of the second primary winding.

Further features of the present invention will become apparent from the following description of exemplary embodiments with reference to the attached drawings.

BRIEF DESCRIPTION OF THE DRAWINGS

FIGS. 6A and 6B illustrate waveforms of combined currents in the second application to the printer described in the first embodiment.

DESCRIPTION OF THE EMBODIMENTS

Preferred embodiments of the present invention will now be described in detail in accordance with the accompanying drawings.

With reference to the drawings, embodiments of the present invention will be described in detail below by way of example.

First Embodiment

[Image Forming Apparatus]

Figure 1:
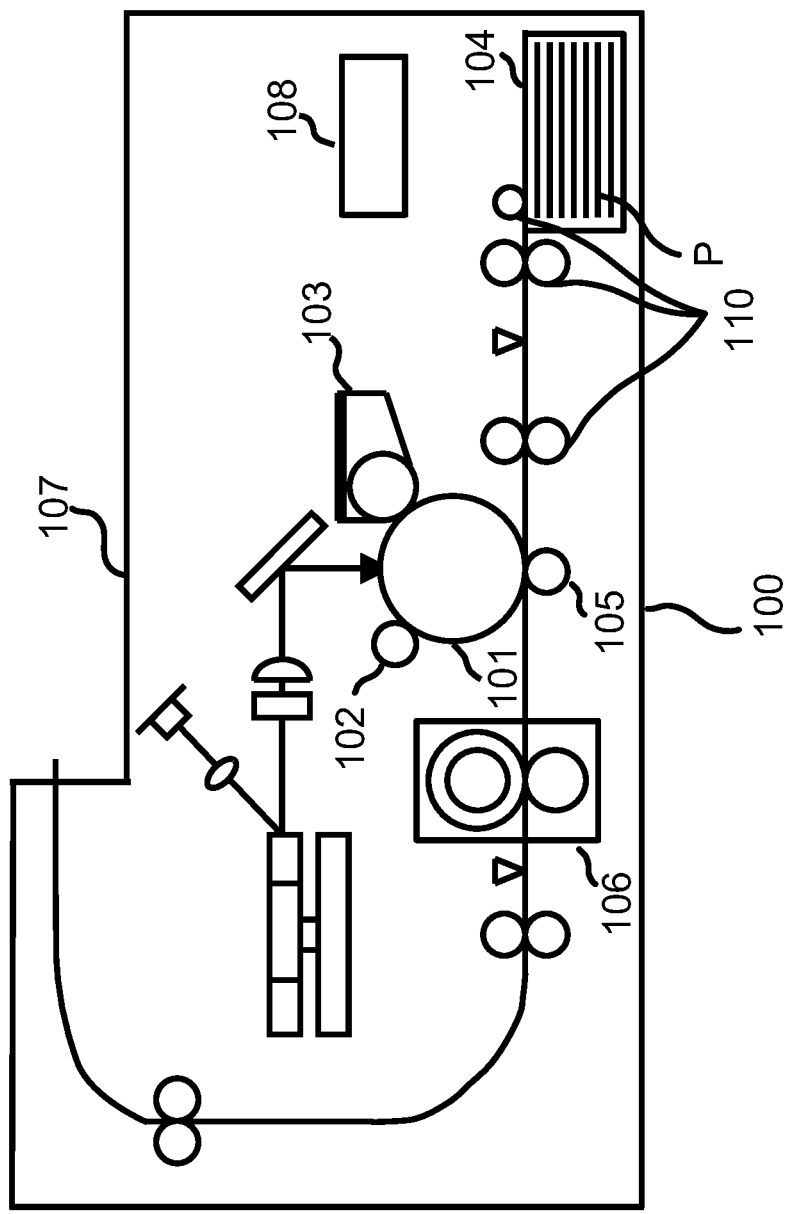
FIG. 1 is a schematic diagram of a laser beam printer in a first embodiment.

In a first embodiment, application of a power supply apparatus of the present invention to an image forming apparatus will be described with reference to FIGS. 1 to 3A and 3B. FIG. 1 illustrates a schematic configuration of a laser beam printer as an example of the image forming apparatus. The laser beam printer (hereafter referred to as a printer) 100 includes a photosensitive drum 101 serving as an image carrier, a charge unit 102 serving as a charge device, and a developing unit 103 serving as a developing device. An electrostatic latent image is formed on the photosensitive drum 101. The charge unit 102 uniformly charges the photosensitive drum 101. The developing unit 103 develops, with toner, the electrostatic latent image formed on the photosensitive drum 101. A sheet P serving as a recording material is supplied from a cassette 104 by components such as rollers 110 serving as a conveyance device. The toner image developed on the photosensitive drum 101 is transferred by a transfer unit 105 serving as a transfer device onto the sheet P. The toner image transferred on the sheet P is fixed by a fixing unit 106 serving as a fixing device, and the sheet P is ejected onto a tray 107. The photosensitive drum 101, the charge unit 102, the developing unit 103, and the transfer unit 105 constitute an image forming unit. The printer 100 also includes a low-voltage power supply 108 serving as a power supply apparatus. The low-voltage power supply 108 supplies power to a control unit (not shown) that controls the operations of forming images and conveying the sheets P, performed by driving units such as motors and by the image forming unit.

[Power Supply Apparatus]

Figure 2:
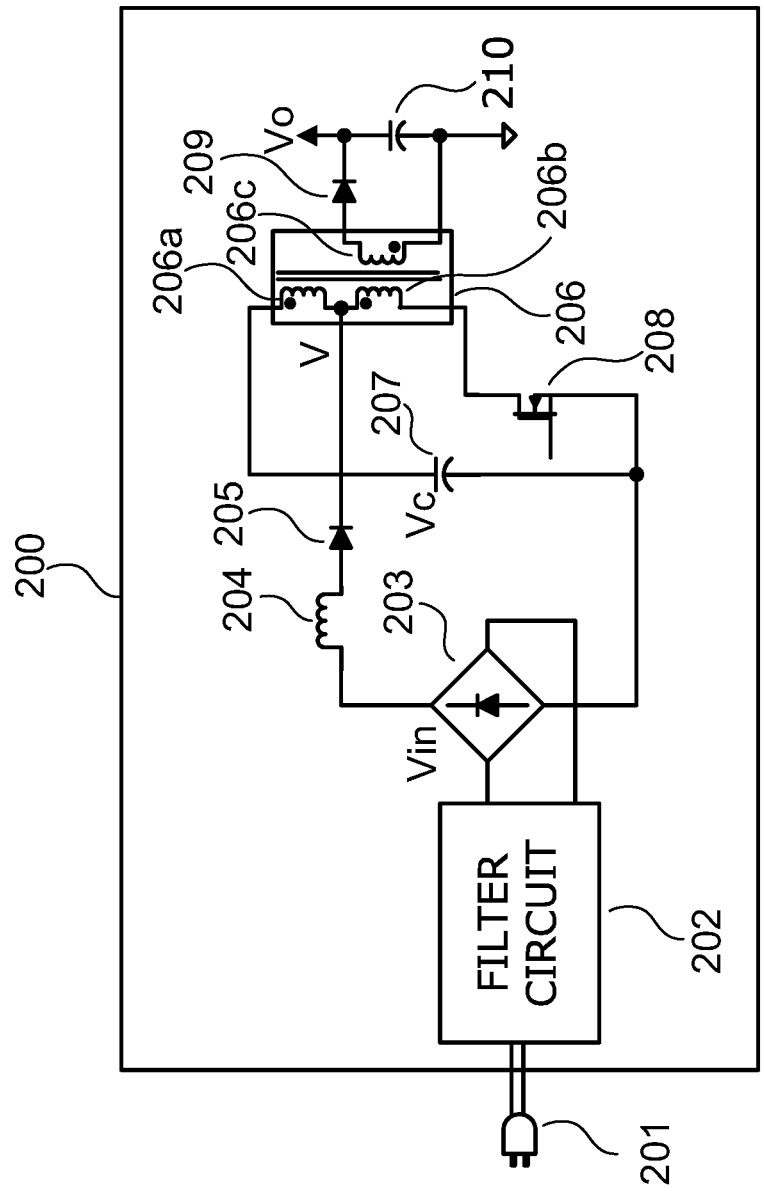
FIG. 2 is a circuit diagram of a switching power supply in the first embodiment.

FIG. 2 is a circuit diagram of a switching power supply 200 in the first embodiment serving as the low-voltage power supply 108. An AC plug 201 is connected to a receptacle to supply AC voltage to the switching power supply 200. The AC voltage supplied to the switching power supply 200 is passed through a filter circuit 202 and full-wave rectified by a diode bridge 203 serving as a full-wave rectification circuit. If the external load powered by the switching power supply 200 consumes substantially constant power and the output voltage Vo is stable, charge voltage charged to an electrolytic capacitor 207 serving as a smoothing device is substantially constant.

The switching power supply 200 includes an input inductor 204 (an inductor), a diode 205 serving as a rectifying element, a transformer 206, and the electrolytic capacitor 207. The transformer 206 has primary windings 206a and 206b and a secondary winding 206c. In the transformer 206, the primary windings 206a and 206b have a polarity different from the polarity of the secondary winding 206c. The input inductor 204 has one end connected to the output end of the diode bridge 203, and another end connected to the anode terminal of the diode 205. The diode 205 has the cathode terminal connected to a connecting point of the primary windings 206a and 206b. That is, the output voltage of the diode bridge 203 is supplied to the connecting point of the primary windings 206a and 206b through the input inductor 204 and the diode 205.

The primary winding 206a of the transformer 206 has one end connected to the positive side of the electrolytic capacitor 207, and another end connected to one end of the primary winding 206b. Another end of the primary winding 206b is connected to the drain terminal of a field-effect transistor (hereafter referred to as an FET) 208. The FET 208, serving as a switching element, has the source terminal connected to the negative side of the electrolytic capacitor 207, and the gate terminal connected to a control IC (not shown) serving as a control unit. That is, the FET 208 is connected to the primary winding 206b of the transformer in series. When gate voltage is supplied from the control IC (not shown) to the gate terminal of the FET 208 to bring the FET 208 into conduction, the charge voltage of the electrolytic capacitor 207 is divided by the primary windings 206a and 206b of the transformer 206. If the output voltage of the diode bridge 203 is higher than this divided voltage, the input current flows to the input inductor 204 and the diode 205.

By making the number of turns of the primary winding 206a greater than the number of turns of the primary winding 206b, the value of the voltage divided by the primary windings 206a and 206b is reduced. The input current therefore starts to flow at a lower output voltage of the diode bridge 203. While the value of the voltage divided by the primary winding 206a and 206b is substantially constant, the output voltage of the diode bridge 203 sinusoidally changes with time. Consequently, the waveform of the input current also sinusoidally changes. The switching power supply 200 can thus achieve a power supply characteristic of a high power factor.

Voltage occurring across the secondary winding 206c changes due to conditions such as the turns ratio between the secondary winding 206c and the primary windings 206a and 206b, and the input voltage. The control IC (not shown) controlling the switching power supply 200 changes the turn-on width and duty of the FET 208 based on feedback signals from the secondary side to control switching operations, thereby controlling the voltage occurring in the secondary winding 206c. The voltage occurring in the secondary winding 206c is rectified and smoothed by a rectification diode 209 and a secondary-side smoothing capacitor 210. The output voltage Vo is thus stabilized at a predetermined voltage. V, Vc, and Vin will be described below.

[Transitions in Waveforms]

Figure 3A:
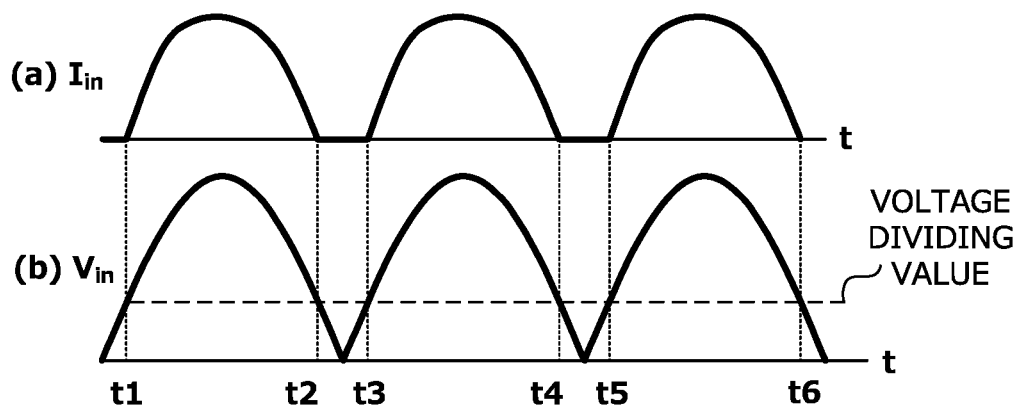
FIG. 3A is a graphical representation illustrating a current waveform and a voltage waveform in the first embodiment.

FIG. 3A illustrates waveforms in which Iin indicates the input current and Vin indicates the output voltage of the diode bridge 203. The input current Iin is the current that is input from the diode bridge 203 to the connecting point of the primary windings 206a and 206b through the input inductor 204 and the diode 205. The output voltage Vin is the voltage that is input from the diode bridge 203 to the connecting point of the primary windings 206a and 206b through the input inductor 204 and the diode 205. FIG. 3A (a) and (b) illustrate the input current Iin and the output voltage Vin, respectively. For both waveforms, the abscissa indicates time t. A dashed line in FIG. 3A (b) indicates the value (a voltage dividing value) of the voltage of the electrolytic capacitor 207 divided by the primary winding 206a and the primary winding 206b, which are a first primary winding and a second primary winding of the transformer 206, respectively.

As shown in FIG. 3A, at the point (time t1 (t3, t5, . . . )) when the output voltage Vin of the diode bridge 203 exceeds the voltage of the electrolytic capacitor 207 divided by the primary windings 206a and 206b, the input current Iin starts to flow. The input current Iin flows until the point (time t2 (t4, t6, . . . )) when the output voltage Vin falls to or below the voltage dividing value. Conversely, the input current Iin does not flow (Iin=0) until the output voltage Vin exceeds the voltage dividing value (for example, from time t2 to time t3). As such, the smaller the voltage dividing value is, the earlier the input current Iin starts to flow and the later the input current Iin stops flowing. This increases the phase angle at which the input current Iin flows, i.e., the conduction angle, enabling an improved power factor.

[Designing of Transformer]

Now, the designing of the transformer 206, which determines the power factor characteristic of the switching power supply 200, will be described in detail. The switching power supply 200 in FIG. 2 is basically configured as a flyback converter. An estimated input power with respect to the output power can therefore be calculated with $$Pin = V^2 \times ton^2 \times f/(2 \times L),\qquad \text{Equation (1)}$$

where Pin is the input power, ton is the turn-on time of the FET 208, f is the driving frequency of the switching operations of the FET 208, and L is the inductance of the primary winding 206b. It is to be noted that the voltage V in Equation (1) is not the output voltage Vin but the midpoint voltage between the primary windings 206a and 206b. This midpoint voltage V is the voltage Vc of the electrolytic capacitor 207 divided by the primary windings 206a and 206b. Let N be the turns ratio between the number of turns of the primary winding 206a and the number of turns of the primary winding 206b (hereafter also referred to as the ratio). Equation (1) is then expressed as $$Pin = (Vc/(N+1))^2 \times ton^2 \times f/(2 \times L).\qquad \text{Equation (2)}$$

The relationship between the input power Pin and the output power Po is expressed as $$Pin = Po/\eta,\qquad \text{Equation (3)}$$

where η is the conversion efficiency in converting from the primary side to the secondary side. Equation (2) can then be transformed as $$Po = \theta \times (Vc/(N+1))^2 \times ton^2 \times f/(2 \times L).\qquad \text{Equation (4)}$$

The inductance L of the primary winding 206b can be calculated to satisfy Equation (4).

The peak value of the current flowing to the primary winding 206b is determined by I=V×ton/L, where V is, again, the voltage Vc of the electrolytic capacitor 207 divided by the primary windings 206a and 206b. That is, $$I = Vc/(N+1) \times ton/L.\qquad \text{Equation (5)}$$

Further, when the FET 208 is ON, the current flowing to the primary winding 206b is the current flowing through the input inductor 204. This current can be calculated by dividing the difference between the output voltage Vin of the diode bridge 203 and the midpoint voltage V by the inductance Lin of the input inductor 204 and multiplying the resulting value by the turn-on time ton. The current flowing to the input inductor 204, denoted as Iin, is expressed as $$Iin = (Vin - Vc \times N206b/(N206a + N206b))/Lin \times ton,\qquad \text{Equation (6)}$$

where N206a is the number of turns of the primary winding 206a, and N206b is the number of turns of the primary winding 206b.

The time period for which the primary-side current flows in the cycle of the AC voltage of the AC power source, i.e., the conduction angle, can be made wider by increasing the number of turns of the primary winding 206a relative to the number of turns of the primary winding 206b. Because this circuit is aimed at achieving a high power factor, a wider conduction angle is more desirable.

Here, discussion will be made regarding how high the turns ratio N can be raised. The total number of turns of the primary windings 206a and 206b (N206a+N206b) is obtained as follows. An estimated turns ratio N can be calculated with the output voltage Vo and the input voltage (here, the minimum of the output voltage Vin of the diode bridge 203). For example, if the output voltage Vin of the diode bridge 203 is AC 85 V and the output voltage Vo is 24 V, the turns ratio between the secondary winding 206c and the primary windings 206a and 206b is approximately 5. Assuming that the number of turns of the secondary winding 206c is 3, the total number of turns of the primary windings 206a and 206b is 15 (=3 turns×5).

According to the conditions:

$$\eta{:}0.85, Vc{:}120V, ton{:}7.5\mu s, f{=}65 \text{ kHz, and } Po{:}100W,$$

the following cases of N=2 to 4 will be studied based on actual calculations.

In the case of N=2

The turns ratio N is 2 and the total number of turns of the primary windings 206a and 206b is 15, so that the number of turns N206b of the primary winding 206b=5 and the number of turns N206a of the primary winding 206a=10. The inductance L of the primary winding 206b is obtained with Equation (4) as $$L = 0.85 \times (120/(2+1))^2 \times 7.5\mu^2 \times 65000/2/100 = 24.9\mu H \approx \mu H.\qquad \text{Equation(7)}$$

The inductance L of the primary winding 206b obtained with Equation (7) is then substituted into Equation (5) to obtain the peak value of the current flowing to the primary winding 206b as $$I = 120/(2+1) \times 7.5\mu/25\mu = 12A.\qquad \text{Equation (8)}$$

The input current Iin flowing to the input inductor 204 is obtained with Equation (6) as $$Iin = (120 - 120 \times 5/15)/40\mu \times 7.5\mu = 15A.\qquad \text{Equation (9)}$$

Here, the inductance Lin of the input inductor 204 is 40 μH. Because Equations (8) and (9) indicate Iin>I, it can be seen that the number of turns of the primary winding 206b (N206b=5) is a feasible set constant.

In the case of N=3

For N=3, again, the number of turns should be an integer and the total number of turns is 15, so that the number of turns N206b of the primary winding 206b=4 and the number of turns N206a of the primary winding 206a=11. The turns ratio N is therefore not the target value 3 but 11/4. The values of the numbers of turns and the other values are substituted into the equations as in the case of N=2 to obtain I=15 A and Iin=16.5 A. Because Iin>I in this case, it can be seen that the number of turns of the primary winding 206b (N206b=4) is a feasible set constant.

In the case of N=4

For N=4, the number of turns N206b of the primary winding 206b=3 and the number of turns N206a of the primary winding 206a=12. As in the case of N=2, the values of the numbers of turns and the other values are substituted into the equations to obtain I=20 A and Iin=18 A. Because Iin<I in this case, the current I to flow to the primary winding 206b would be larger than the input current Iin flowing through the input inductor 204. It can therefore be seen that these set constants are unfeasible.

Equation (6) suggests that further reducing the inductance Lin of the input inductor 204 can further increase the current Iin flowing to the input inductor 204. This idea could be adopted here to make the current Iin larger than or equal to the current I to flow to the primary winding 206b. However, if the inductance Lin of the input inductor 204 is reduced to increase the input current Iin flowing, the voltage of the electrolytic capacitor 207 would increase due to the charge current charged while the FET 208 is OFF. This would necessitate using an element with a high voltage rating for the FET 208. An increased peak current also increases the surge voltage of the FET 208, so that the FET 208 needs to be one with a high current rating. Further, under the above conditions, the peak current already reaches around 20 A. In consideration of factors such as the ratings and losses of the semiconductor being used or losses of the windings in the transformer 206, the current would be close to the limit of practically usable current. From the above discussion, the turns ratio N may be 3 at the maximum.

[First Application to Printer]

Figure 3B:
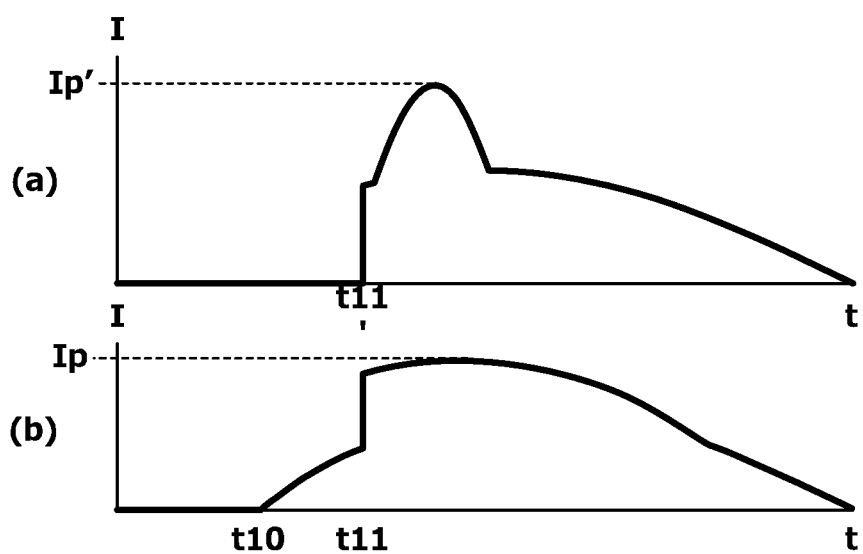
FIG. 3B is a graphical representation illustrating current waveforms of the laser beam printer.

Now, with reference to FIG. 3B, an example will be described in which the low-voltage power supply 108 with a conduction angle increased as above is applied to the printer 100. FIG. 3B illustrates waveforms of a combination of the current in the fixing unit 106 and the current in the low-voltage power supply 108. FIG. 3B (a) illustrates a waveform of the combined current in a case where the low-voltage power supply 108 is of capacitor-input type, which is a common power supply scheme. FIG. 3B (b) illustrates a waveform of the combined current in a case where the low-voltage power supply 108 employs the power supply scheme in the first embodiment. For both waveforms, the ordinate indicates current I and the abscissa indicates time t. The current waveform of the fixing unit 106 is based on fixing control called phase control, in which the current does not flow for predetermined time periods.

In FIG. 3B (a), the time period up to time t11' with no current flowing is longer, resulting in a narrower conduction angle. In FIG. 3B (b), in contrast to FIG. 3B (a), the current starts to flow at time t10, which is earlier than time t11, as an effect of the first embodiment: it can therefore be seen that the current flows for a longer time period, resulting in a wider conduction angle. The peak Ip of the current in FIG. 3B (b) is also lower than Ip' in FIG. 3B (a) (Ip<Ip'), making the waveform closer to a sinusoidal shape. The power factor can thus be improved for the waveform in FIG. 3B (b).

As described above, by making the number of turns of the primary winding 206a greater relative to the number of turns of the primary winding 206b, the conduction angle of the input current can be increased with respect to the cycle of the AC voltage input from the AC power source. The greater the number of turns of the primary winding 206a relative to the number of turns of the primary winding 206b, the larger the current flowing to the input inductor 204 and the diode 205. The lower the inductance of the input inductor 204, the larger the current flowing to the input inductor 204 and the diode 205. Under the above-mentioned conditions, the turns ratio N of the primary winding 206a to the primary winding 206b can be increased up to 3. That is, the number of turns of the primary winding 206a is smaller than or equal to three times the number of turns of the primary winding 206b. Further, applying the low-voltage power supply 108 in the first embodiment to the printer 100 can improve the power factor experienced while power is supplied from the power supply.

[Second Application to Printer]

Figure 5:
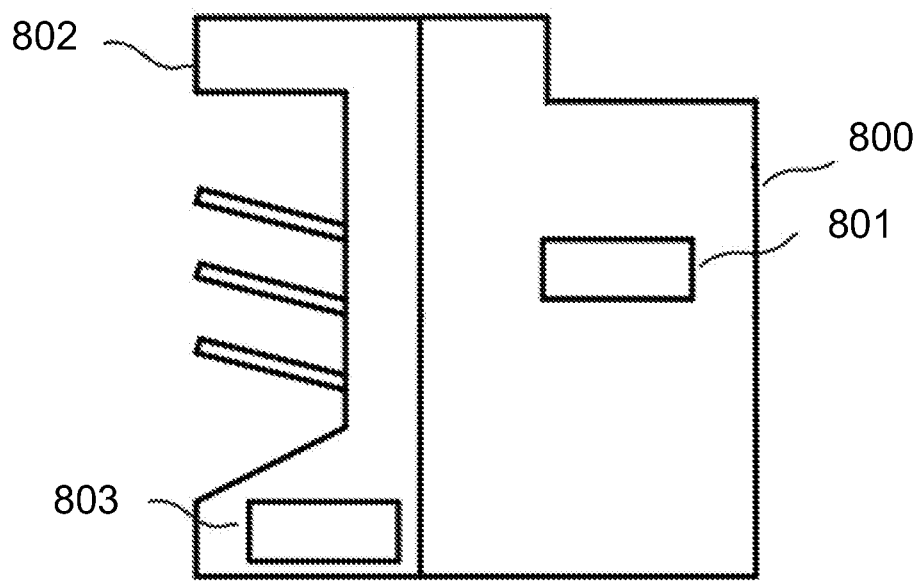
FIG. 5 is a configuration diagram of a second application to the printer described in the first embodiment.

Some printers are configured as shown in FIG. 5, in which an output option unit 802 is connected to a printer main body 800. In this configuration, the printer has a low-voltage power supply 801 (a first power supply device) for supplying power to the printer main body 800, and a low-voltage power supply 803 (a second power supply device) for supplying power to the output option unit 802. The printer main body 800 is basically configured as with the printer 100 as an image forming apparatus in FIG. 1 and therefore will not be described. The low-voltage power supply 803 is configured as in FIG. 2 and therefore will not be described. The output option unit 802 is an option unit having a sort function, which allows sheets serving as a recording material to be ejected in different sets as shown in FIG. 5. FIG. 5 shows the output option unit having three ejection bins. Instead of the output option unit with the sort function, any sheet-processing option unit may be employed, such as an output option unit with the function of stapling sheets on which images have been formed. In this configuration, the low-voltage power supply 803 corresponds to the low-voltage power supply shown in FIG. 2. The low-voltage power supply 801 is a power supply of capacitor-input type, which is a common power supply scheme.

Figure 6B:
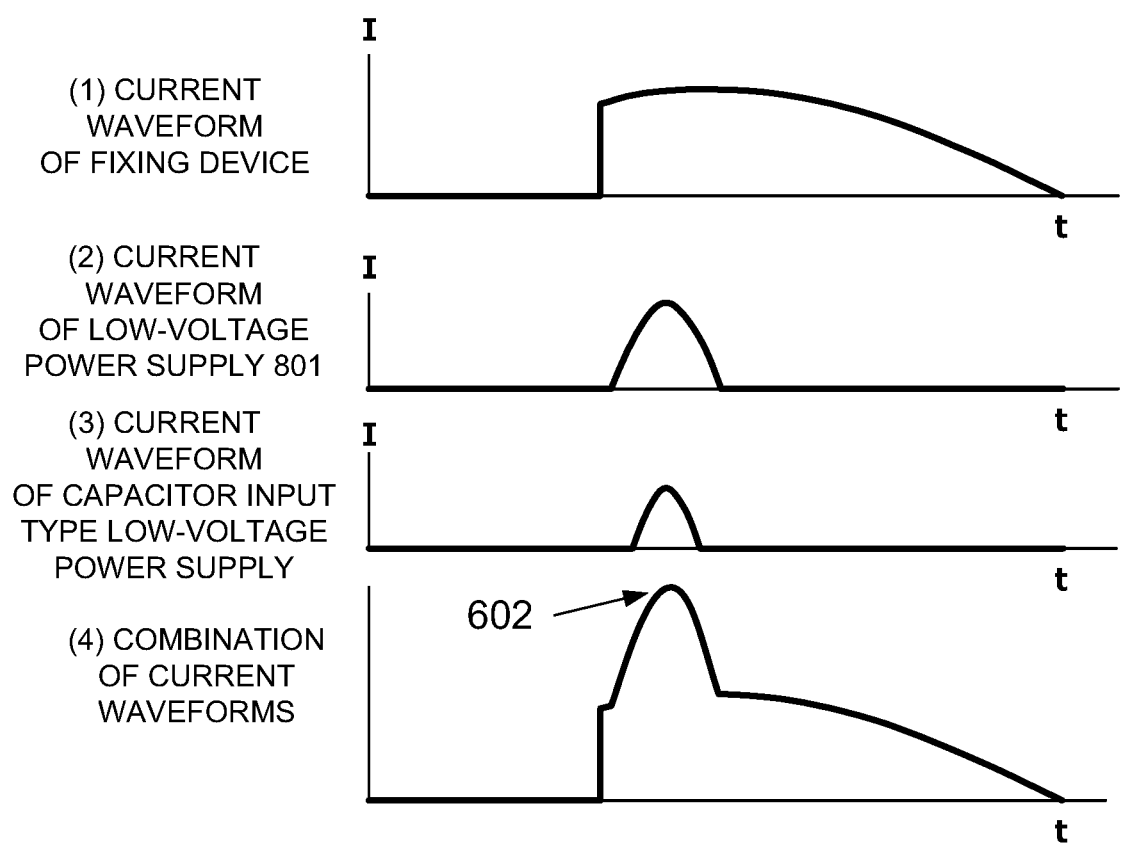

Combined current waveforms in the above configuration will be described. FIG. 6A illustrates a waveform of a combination of the current in the fixing unit (106 in FIG. 1) and the currents in the low-voltage power supplies 801 and 803. In the figure, the ordinate indicates current I and the abscissa indicates time t. FIG. 6A illustrates (1) a current waveform of the fixing unit, (2) a current waveform of the low-voltage power supply 801, (3) a current waveform of the low-voltage power supply 803, and (4) a combination of the current waveforms (1) to (3). By contrast, FIG. 6B illustrates a waveform of a combination of currents obtained in a case where the low-voltage power supply 803 is a general power supply of capacitor-input type, rather than a low-voltage power supply according to this embodiment.

Comparison between FIGS. 6A and 6B indicates that, in the combined current waveform in FIG. 6A, the current flows during a time period 601 in which no current flows in FIG. 6B. The power factor in FIG. 6A is therefore generally better than the power factor in FIG. 6B. The power factor in FIG. 6A is also better than the power factor in FIG. 6B because the current peak value 602 is smaller in FIG. 6A than in FIG. 6B.

As above, in the apparatus in which the output option unit 802 is connected to the printer main body 800, applying the power supply according to this embodiment to the output option unit 802 can improve the power factor experienced while power is supplied from the power supply.

Thus, according to the first embodiment, the time period for which input current flows in the cycle of AC voltage can be increased to achieve a high power factor characteristic.

Second Embodiment

[Power Supply Apparatus]

Figure 4:
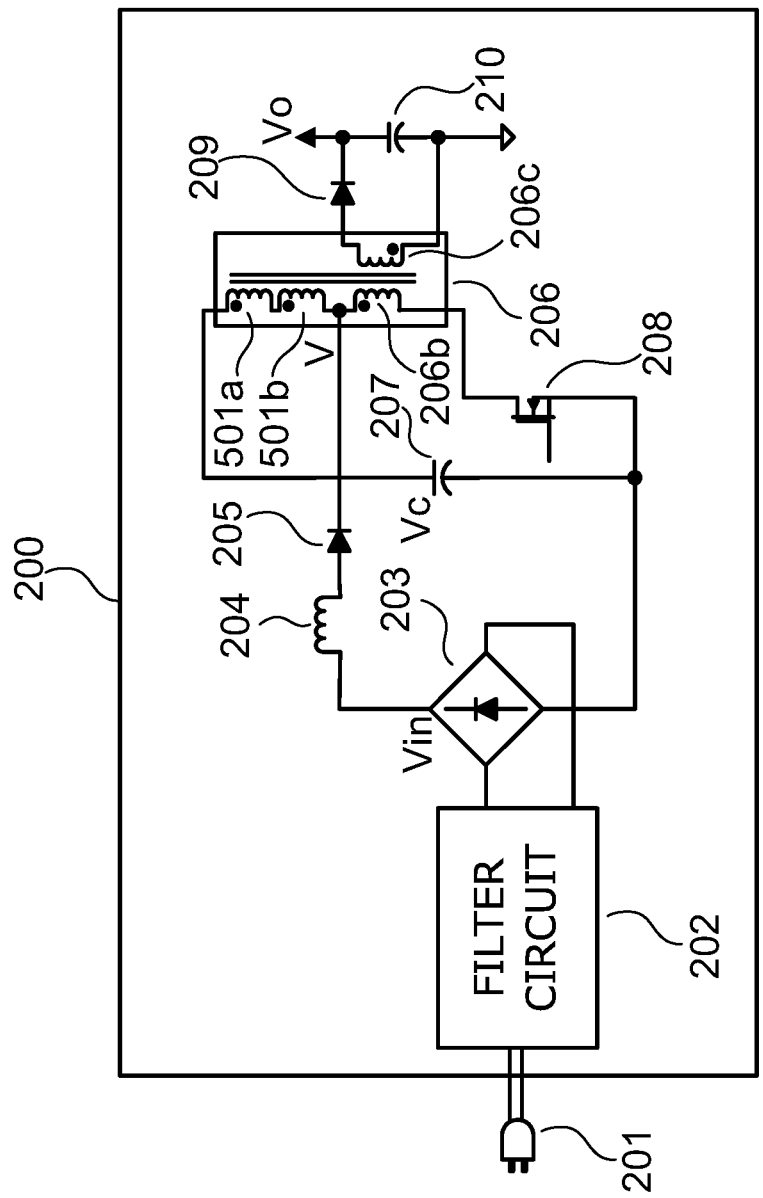
FIG. 4 is a circuit diagram of a switching power supply in a second embodiment.

The first embodiment has been described for the case where the primary winding 206a is a single winding. In a second embodiment, the primary winding 206a is divided into multiple windings, for example two windings. The second embodiment will be described with reference to a circuit diagram in FIG. 4. In FIG. 4, a primary winding corresponding to the primary winding 206a in FIG. 2 is divided into primary windings 501a and 501b. The other components, which are the same as in FIG. 2, are given like symbols and will not be described.

In the case where the primary winding 206a is divided into the primary windings 501a and 501b, the voltage dividing value V of the electrolytic capacitor 207 is still the voltage at a point indicated above the primary winding 206b in FIG. 2 (the voltage at the connecting point of the primary winding 501b and the primary winding 206b). The voltage dividing value is determined by the turns ratio between the total number of turns of the primary windings 501a, 501b and 206b and the number of turns of the primary winding 206b. When the output voltage Vin of the diode bridge 203 exceeds this voltage dividing value, the input current Iin starts to flow. As such, increasing the total number of turns of the primary windings 501a and 501b relative to the number of turns of the primary winding 206b reduces the voltage dividing value, enabling the conduction angle of the input current Iin to be increased. In this manner, if the primary winding 206a is divided into two windings like the primary windings 501a and 501b, the same effects can still be achieved by setting a greater total number of turns of the primary windings 501a and 501b.

As described above, for the primary winding 206a divided into two windings, i.e., the primary windings 501a and 501b, the total number of turns of the primary windings 501a and 501b is made greater relative to the number of turns of the primary winding 206b. This enables an increased conduction angle. Although the primary winding 206a is divided into two windings in the description of the second embodiment, similar effects can be achieved by dividing the primary winding 206a into more than two windings.

Thus, according to the second embodiment, the time period for which input current flows in the cycle of AC voltage can be increased to improve the power factor, thereby achieving a high power factor characteristic.

In the circuits in the above first and second embodiments (FIGS. 2 and 4), the circuit to which input inductor 204 and diode 205 are connected in series is explained as an aspect of the arrangement in which the input inductor 204 is connected to a side of the diode bridge 203. This arrangement, however, is not restrictive. Similar effects can also be achieved with the diode 205 connected to the diode bridge 203.

Specifically, the diode 205 is connected to the diode bridge 203 as follows. The rectifying element (the diode 205) has the anode terminal connected to the output end of the diode bridge 203, and the cathode terminal connected to one end of the input inductor 204. Another end of the input inductor 204 is connected to the connecting point of the primary windings 206a and 206b.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-195264, filed Oct. 28, 2019 and Japanese Patent Application No. 2020-170747, filed Oct. 8, 2020, which are hereby incorporated by reference herein in their entirety.

What is claimed is:

1. A power supply apparatus comprising:
   a transformer having a first primary winding, a second primary winding, and a secondary winding;
   a switching element connected in series with the first primary winding and the second primary winding;
   a full-wave rectification circuit configured to full-wave rectify input AC voltage;
   a smoothing circuit having one end connected to the first primary winding, and another end connected to the second primary winding through the switching element; and
   a circuit in which an inductor and a rectifying element are connected in series, the circuit connected to an output end of the full-wave rectification circuit,
   wherein a number of turns of the first primary winding is greater than a number of turns of the second primary winding.

2. A power supply apparatus according to claim 1, wherein the greater the number of turns of the first primary winding with regard to the number of turns of the second primary winding is, the larger a current flowing to the inductor and the rectifying element is.

3. A power supply apparatus according to claim 1, wherein the lower an inductance of the inductor is, the larger a current flowing to the inductor and the rectifying element is.

4. A power supply apparatus according to claim 3, wherein the number of turns of the first primary winding is smaller than or equal to three times the number of turns of the second primary winding.

5. A power supply apparatus according to claim 1, wherein the first primary winding and the second primary winding have a polarity different from a polarity of the secondary winding.

6. A power supply apparatus according to claim 1, wherein the first primary winding comprises a plurality of windings, each of which is connected in series with each other.

7. A power supply apparatus according to claim 1, wherein the inductor has one end connected to the output end of the full-wave rectification circuit, and the rectifying element has an anode terminal connected to another end of the inductor, and a cathode terminal connected to a connecting point of the first primary winding and the second primary winding.

8. An image forming apparatus comprising:
   an image forming unit configured to form a toner image on a recording material; and
   a power supply device configured to supply power to the image forming unit,
   the power supply device comprising:
   a transformer having a first primary winding, a second primary winding, and a secondary winding;
   a switching element connected in series with the first primary winding and the second primary winding;
   a full-wave rectification circuit configured to full-wave rectify input AC voltage;
   a smoothing circuit having one end connected to the first primary winding, and another end connected to the second primary winding through the switching element; and
   a circuit in which an inductor and a rectifying element are connected in series, the circuit connected to an output end of the full-wave rectification circuit,
   wherein a number of turns of the first primary winding is greater than a number of turns of the second primary winding.

9. An image forming apparatus according to claim 8, wherein the greater the number of turns of the first primary winding with regard to the number of turns of the second primary winding is, the larger a current flowing to the inductor and the rectifying element is.

10. An image forming apparatus according to claim 8, comprising a fixing device configured to fix an image formed on the recording material onto the recording material,
  wherein current flows to the power supply device in a time period in which no current flows to the fixing device.

11. An image forming apparatus to which an option unit is connected, the option unit configured to process a recording material on which an image is formed, the image forming apparatus comprising:
  an image forming unit configured to form a toner image on a recording material;
  a first power supply device configured to supply power to the image forming unit; and
  a second power supply device configured to supply power to the option unit,
  the second power supply device comprising:
  a transformer having a first primary winding, a second primary winding, and a secondary winding;
  a switching element connected in series with the first primary winding and the second primary winding;
  a full-wave rectification circuit configured to full-wave rectify input AC voltage;
  a smoothing circuit having one end connected to the first primary winding, and another end connected to the second primary winding through the switching element; and
  a circuit in which an inductor and a rectifying element are connected in series, the circuit connected to an output end of the full-wave rectification circuit,
  wherein a number of turns of the first primary winding is greater than a number of turns of the second primary winding.

12. An image forming apparatus according to claim 11, wherein the greater the number of turns of the first primary winding with regard to the number of turns of the second primary winding is, the larger a current flowing to the inductor and the rectifying element is.

13. An image forming apparatus according to claim 11, comprising a fixing device configured to fix an image formed on the recording material onto the recording material,
  wherein current flows to the second power supply device in a time period in which no current flows to the fixing device.

* * * * *